(12) United States Patent
Kalnitski et al.

(10) Patent No.: US 11,970,034 B2
(45) Date of Patent: Apr. 30, 2024

(54) DAMPER UNIT FOR A CHASSIS OF A VEHICLE WITH LEVELLING

(71) Applicant: E:FS TECHHUB GMBH, Gaimersheim (DE)

(72) Inventors: Alex Kalnitski, Wettstetten (DE); Gregor Mader, Ortsteil Töging (DE); Franz Peter, Ingolstadt (DE); Sebastian Tippl, Ingolstadt (DE)

(73) Assignee: E:FS TECHHUB GMBH, Gaimersheim (DE)

( * ) Notice: Subject to any disclaimer, the term of this patent is extended or adjusted under 35 U.S.C. 154(b) by 505 days.

(21) Appl. No.: 17/053,755

(22) PCT Filed: May 3, 2019

(86) PCT No.: PCT/DE2019/100396
§ 371 (c)(1),
(2) Date: Jul. 6, 2021

(87) PCT Pub. No.: WO2019/214770
PCT Pub. Date: Nov. 14, 2019

(65) Prior Publication Data
US 2021/0331544 A1 Oct. 28, 2021

(30) Foreign Application Priority Data
May 7, 2018 (DE) .......................... 102018110916.4

(51) Int. Cl.
*B60G 15/08* (2006.01)
*B60G 13/08* (2006.01)
(Continued)

(52) U.S. Cl.
CPC ............. *B60G 13/08* (2013.01); *B60G 13/14* (2013.01); *B60G 15/062* (2013.01);
(Continued)

(58) Field of Classification Search
CPC ...... B60G 13/08; B60G 13/14; B60G 15/062; B60G 21/073; B60G 2202/242; B60G 2204/8304
(Continued)

(56) References Cited

U.S. PATENT DOCUMENTS 3,921,746 A 11/1975 Lewus
4,295,538 A 10/1981 Lewus
(Continued)

FOREIGN PATENT DOCUMENTS

CN 201472099 U 5/2010
CN 104373497 A 2/2015
(Continued)

*Primary Examiner* — Christopher P Schwartz
(74) *Attorney, Agent, or Firm* — Mark Terry

(57) ABSTRACT

The invention relates to a damper unit (10) for a chassis (100) of a vehicle with levelling, comprising a hydraulic cylinder (1) having a container tube (2) which is filled with a damper fluid and in which a piston (3) is movably mounted and separates an upper container space (21) from a lower container space (22). The piston (3) comprises a first valve (41) through which the damper fluid flows when the piston (3) moves in a first direction A. The damper unit (10) further comprises an accumulator (5) and a check valve (6), wherein the accumulator (5) is connected to the container tube (2) via the check valve (6) in such a manner that, when the piston (3) moves in at least one direction, damper fluid is pumped through the check valve (6) into the accumulator (5).

14 Claims, 5 Drawing Sheets

(51) Int. Cl.
  *B60G 13/14* (2006.01)
  *B60G 15/06* (2006.01)
  *B60G 21/073* (2006.01)

(52) U.S. Cl.
  CPC ...... *B60G 21/073* (2013.01); *B60G 2202/242* (2013.01); *B60G 2204/8304* (2013.01)

(58) Field of Classification Search
  USPC ........................................ 280/5.509, 124.159
  See application file for complete search history.

(56) References Cited

U.S. PATENT DOCUMENTS

| | | | | |
|---|---|---|---|---|
| 5,219,152 A | * | 6/1993 | Derrien | B60G 13/08 280/43.23 |
| 7,686,309 B2 | * | 3/2010 | Munday | B60G 21/06 280/5.506 |
| 9,481,221 B2 | * | 11/2016 | Reybrouck | F16F 9/46 |
| 10,214,071 B1 | * | 2/2019 | Dillenbeck | B60G 17/0272 |
| 2014/0015215 A1 | * | 1/2014 | Bauer | B60G 17/056 280/124.159 |

FOREIGN PATENT DOCUMENTS

| | | | | | |
|---|---|---|---|---|---|
| CN | 104476997 | A | * | 4/2015 | ............ B60G 13/18 |
| CN | 105539060 | A | | 5/2016 | |
| CN | 106114111 | A | * | 11/2016 | ............ B60G 11/30 |
| CN | 106183686 | A | | 12/2016 | |
| CN | 107116984 | A | | 9/2017 | |
| DE | 1530531 | | | 2/1970 | |
| DE | 2830075 | A1 | | 1/1980 | |
| DE | 102009056874 | A1 | | 7/2010 | |
| DE | 112012004573 | T5 | | 8/2014 | |
| DE | 112013005150 | T5 | | 8/2015 | |
| DE | 102014208320 | A1 | | 11/2015 | |
| EP | 1987268 | B1 | | 11/2008 | |
| JP | 2011025901 | A | | 2/2011 | |
| WO | 2016198919 | A1 | | 12/2016 | |

* cited by examiner

DAMPER UNIT FOR A CHASSIS OF A VEHICLE WITH LEVELLING

The invention relates to a damper unit for a chassis of a vehicle with leveling system according to the independent claim.

The invention pertains to the technical field of motor vehicles with level-controlled chassis, especially the problem of changing the level position of the vehicle by means of the vehicle dampers when implementing the leveling function.

Conventional dampers for a motor vehicle comprise a hydraulic cylinder in which a piston is movably mounted in a container tube filled with damper fluid (oil, gas, . . . ). The container tube is directly connected to the wheel and the piston rod is fixed to the vehicle body.

The relative movement between wheel (or wheel suspension) and vehicle body is damped by the piston each opening a hydraulic valve through which fluid flows for the traction direction (distance wheel to vehicle body increases), and a hydraulic valve for the compression direction (distance wheel to vehicle body decreases). Thereby, movement of the piston causes energy (vibration energy) introduced/induced into the chassis due to external excitations/influences to be released in the form of heat and remains unused.

A drawback of conventional dampers is that the energy released during damping of the chassis vibration remains unused.

Firstly, DE 15 30 531 C is known from the state of the art.

From the state of the art, DE 2 83 00 75 A 1 discloses a vehicle in which energy of the axle vibration is stored by means of an electrical converter. In this process, induction current is generated by means of a correspondingly designed coil assembly during axle movement. The induction current provides the electrical energy to be used by electrical consumers. This solution involves a complicated and error-prone structure in which only little electrical energy from the axle vibration is available for the electrical consumers, such as e.g. a pump for a chassis. Therefore, the operation of a level-controlled chassis is not described therein.

It is the object of the present invention to provide a damper unit for a chassis of a vehicle with leveling system, which uses energy derived from the damping of the vehicle and which is of simple design.

This object is achieved by a damper unit for a chassis of a vehicle with leveling system according to the independent claim. Advantageous aspects constitute the subject-matter of the respective subclaims.

The invention encompasses a damper unit for a chassis of a vehicle with leveling system. The damper unit (actuator unit) comprises a hydraulic cylinder having a container tube which is filled with a damper fluid and in which a piston is movably mounted and separates an upper container space from a lower container space. The piston comprises a (single) first valve through which the damper fluid flows when the piston moves in a first direction (A; traction direction or compression direction). The damper unit further comprises a pressure accumulator and a check valve. The pressure accumulator is connected to the container tube via the check valve in such a manner that, when the piston moves in at least one direction, damper fluid is pumped through the check valve into the pressure accumulator. As the damper fluid is pumped through the check valve into the pressure accumulator, the pressure level in the damper accumulator increases. The damper fluid under this increased pressure can be guided into a container space and thus can move (e.g. lift) the piston, which changes the height level of the vehicle. The damper unit thus provided uses the energy induced by vehicle movement in a simple way to actuate a chassis for a vehicle with leveling system.

According to an advantageous aspect, the pressure accumulator is connected to the container tube on the upper container space via the check valve. When the piston moves (upwards) in the direction of the piston rod, damper fluid is pumped through the check valve into the pressure accumulator. In this way, energy dissipated during damping of the return movement of the chassis or during rebound can be stored for the leveling system.

Another advantageous aspect of the invention provides that the piston rod is indirectly or directly tensioned against the container tube by means of a spring. In the case that the piston rod is directly tensioned against the container tube by means of a spring, the advantages described can be realized with a compact damper unit. For example, the spring can be arranged horizontally around the piston rod. In the case that the piston rod is indirectly tensioned against the container tube by means of a spring, the spring can be arranged next to the piston rod.

A technically preferred aspect of the invention provides that the pressure accumulator includes a pressure-limiting unit (e.g. a pressure-limiting valve). The pressure-limiting unit causes pressure in the pressure accumulator not to rise above a predetermined threshold value. For this purpose, the pressure-limiting unit can drain the hydraulic fluid when the threshold is exceeded or feed it back into the container tube again.

Another aspect provides that the damper unit also includes a reservoir for the damper fluid. In general, the reservoir is a volume that can absorb and release damper fluid in response to minimal pressure change. The pressure-limiting unit is disposed between the pressure accumulator and the reservoir. The reservoir can thereby be kept at a predetermined pressure level.

A particularly preferred aspect in this regard is that the reservoir is a pressureless reservoir. In this technical context, pressureless means that exclusively atmospheric pressure prevails.

According to another preferred technical aspect, the pressure accumulator is a pneumatic pressure accumulator. For example, the pressure accumulator is a hermetically sealed container in which a predetermined volume of compressed air can be kept. This volume of compressed air can be individually selected according to the requirements on and the size of the damper unit. A preferred example is a hydropneumatic pressure accumulator, in which a container is divided into two chambers by a flexible partition wall. One chamber contains the pressurized damper fluid (liquid) and the other chamber contains a gas, such as nitrogen. With an energy accumulator of this type, the energy supplied when the vehicle hight is lowered can be absorbed and then can be made available again.

Alternatively or additively, the pressure accumulator can be a mechanical pressure accumulator, in which, for example, mechanical deformation energy is stored in a spring (such as a coil spring).

Particularly preferably, the pressure-limiting unit is designed in such a way that it has an opening pressure. It is advantageous if the pressure-limiting unit is designed in such a way that the opening pressure is set in such a way that the chassis can still be adjusted above the maximum height due to the energy stored in the pressure accumulator.

Another particularly preferred aspect is that the pressure-limiting unit is designed in such a way that it has an adjustable opening pressure. The setting can, for example, be adjusted to conform to the type of terrain being travelled on.

Furthermore, the pressure-limiting unit can include a throttle unit and/or an orifice unit to control the damper fluid. In the simplest case, the pressure-limiting unit itself is designed as a throttle valve.

According to another advantageous technical aspect, the damper unit includes a switching valve (e.g. further check valve, adjustable spring-loaded check valve, switching unit), a further pressure accumulator and a further pressure-limiting unit (adjustable pressure-limiting unit). Functionally, a check valve is also understood to be a switching unit or a switching valve. Firstly, the pressure accumulator, which is located closer to the cylinder, is filled without filling the subsequently connected further pressure accumulator. When the first pressure accumulator is filled, overpressure is not released, but overpressure is used to fill the further pressure accumulator via a further check valve with defined opening pressure. The pressure or the pressurized damper fluid of the further pressure accumulator can be used via a switchable valve to reach the low level and associated filling of the first pressure accumulator.

Particularly preferably, the damper unit also includes a pump unit. The pump unit preferably comprises a hydraulic pump or a pneumatic pump (with electrical control unit). In this context, the upper and lower damper chambers are connected by a pump unit which conveys in the direction of the upper pump chamber. This allows the level to be adjusted without induced roadway surface excitation (e.g. when being stationary).

According to another advantageous aspect, the invention also encompasses a chassis with several damper units (as described herein). Each damper unit comprises a pressure accumulator. Preferably, at least two damper units comprise one common pressure accumulator.

A technically advantageous aspect provides that the pressure accumulators and the reservoirs are each fluidically (hydraulically) connected via valves, throttles or orifices.

In the following, the invention will be explained in greater detail using the figures. The reference signs are identically used in all figures. All variants can be combined with each other. In the drawings:

FIG. 1 shows a damper unit 10 according to an exemplary embodiment of the invention. In a motor vehicle, four damper units 10, i.e. one per wheel, can be used to realize a chassis (see FIG. 6) with leveling system.

Figure 1:
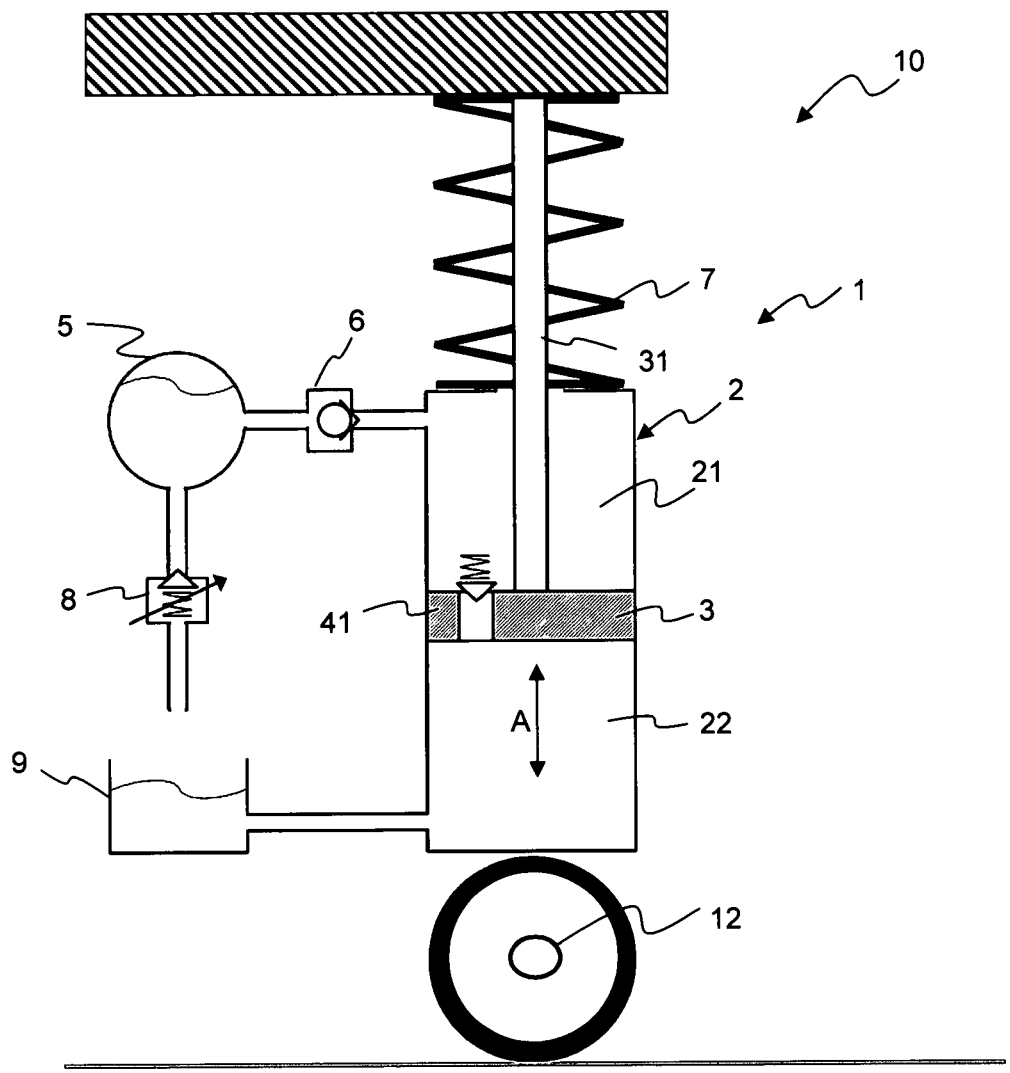
FIG. 1 shows a schematic representation of a damper unit for a chassis of a vehicle with leveling system according to an exemplary embodiment of the invention.

The damper unit 10 comprises a hydraulic cylinder 1 having a container tube 2 which is filled with a damper fluid (e.g. hydraulic fluid). A piston 3 is movably mounted in the container tube 2. The piston 3 is guided in a fluid-tight manner on the inner wall of the container tube 2 in such a way that it is (fluidically) separated from the piston 3 moving therein into an upper container space 21 and a lower container space 22.

A first valve 41 to be flown through by the damper fluid when the piston 3 moves in a first direction A is provided in the piston 3. In the example shown, the first valve 41 is designed in the manner of a throttle valve, which opens downwards when the piston moves in one direction (compression direction) to allow a damper fluid to flow from the lower container space 22 into the upper container space 21.

The damper unit 10 has a pressure accumulator 5 and a check valve 6, whereby the check valve 6 is connected to the upper container space 21 and connects the same to the pressure accumulator 5. The check valve 6 acts in such a way that it opens upwards with movement of the piston in the direction (traction direction) to allow a damper fluid to flow from the upper container space 21 into the pressure accumulator. In this way, damper fluid is pumped through the check valve 6 into the pressure accumulator 5 while the spring 7 relaxes. The pressure accumulator 5 is a pneumatic pressure accumulator. The damper unit 10 thus provided uses the energy, induced by vehicle movement, in a simple way to actuate a chassis (see FIG. 6) for a vehicle with leveling system.

In the variant shown, in which the pressure accumulator 5 is connected to the container tube 2 on the upper container space 21 via the check valve 6, in the case of movement of the piston 3 in the downward direction (away from that of the piston rod 31), damper fluid is pumped through the valve 41 into the upper container space and, in the case of upward movement (in the direction of the piston rod 31), is pumped through the check valve 6 into the pressure accumulator 5. In principle, this device also works in the opposite direction if the valves and the pressure accumulator are adjusted accordingly and are connected to the lower container space.

In the variant shown, the piston rod 31, which is directly attached to the vehicle body, is tensioned against the container tube 2 by means of a spring 7.

Below the pressure accumulator 5, a pressure-limiting unit 8 is disposed, which is connected to a reservoir 9. In the example shown, the pressure-limiting unit 8 has a predetermined and/or regulated opening pressure at which it opens. This can prevent damage to the pressure accumulator 5 due to overpressure. The opening pressure of the pressure-limiting unit 8 is selected to ensure complete lowering (maximum stroke from a high position of the chassis to a low position of the chassis) of the level-controlled chassis (and vice versa to reach a high level). In this regard, it may be provided that the pressure-limiting unit 8 has an adjustable/regulated opening pressure, which can be selected, for example, in accordance with the payload.

Figure 2:
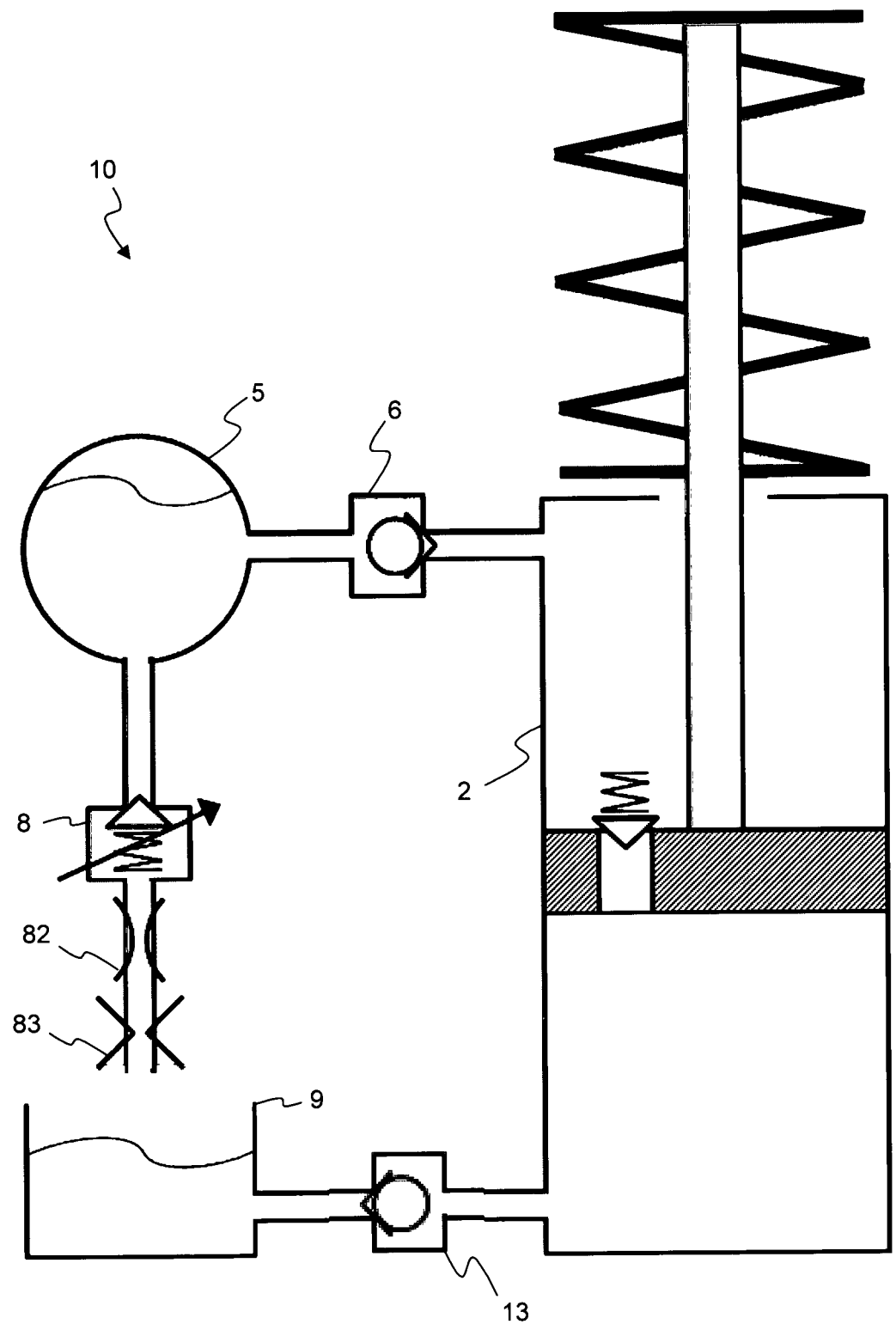
FIG. 2 shows a variant of the damper unit from FIG. 1 with a throttle unit and an orifice unit.

A variant of the damper unit 10 described above is shown in FIG. 2. The damper unit 10 comprises a pressure accumulator 5 which is connected to the container tube 2 via a check valve 6. The pressure accumulator 5 is connected to a pressure-limiting unit 8 which in turn is connected to a reservoir 9, into which excess damper fluid is introduced when a predetermined pressure in the pressure accumulator 5 has been exceeded. Between the hydraulic valve 8 and the reservoir 9, a throttle unit 82 and/or an orifice unit 83 are disposed. The damper unit 10 includes an additional check valve 13 between the reservoir 9 and the container tube 2.

Figure 3:
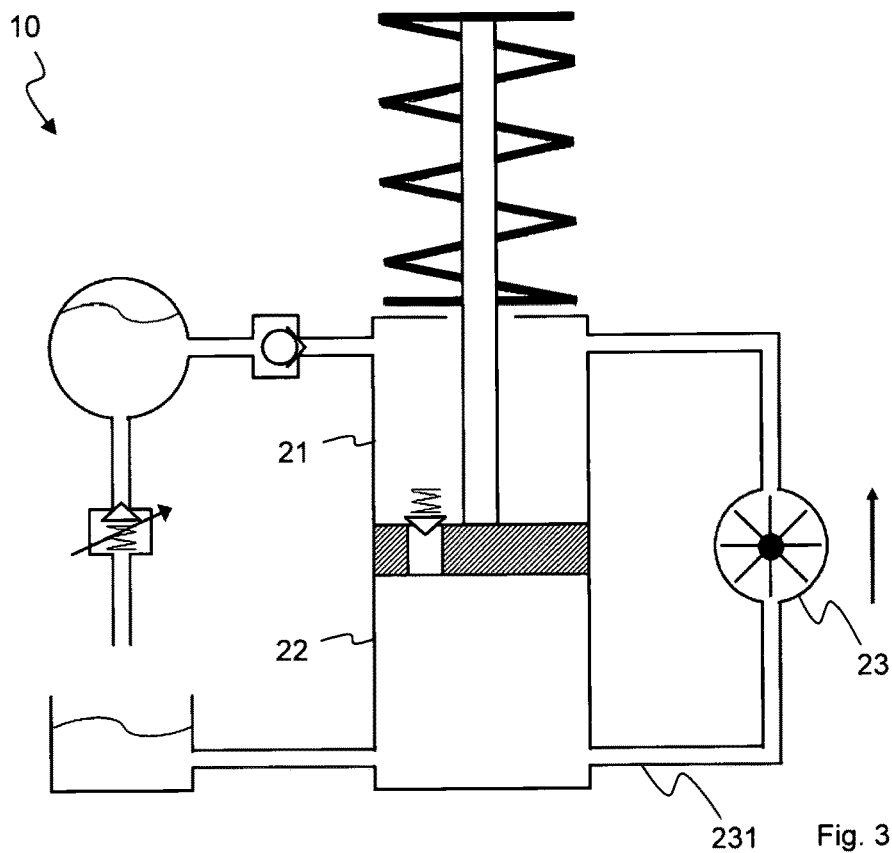
FIG. 3 shows a variant of the damper unit from FIG. 1 with a pump unit.
Figure 4:
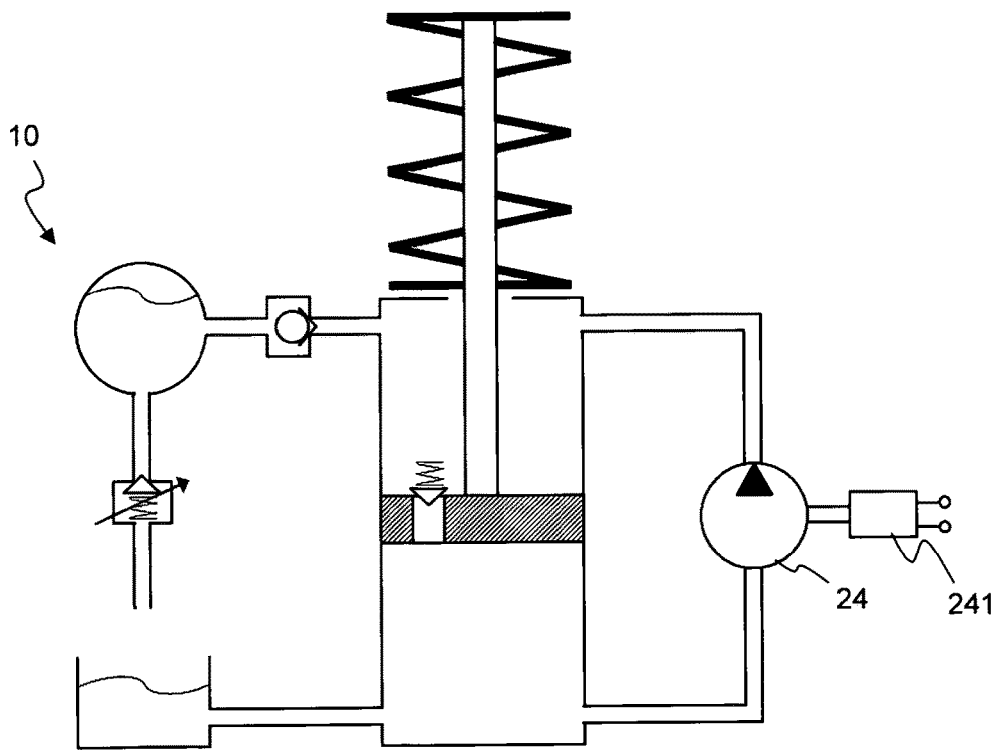
FIG. 4 shows another variant of the damper unit from FIG. 1 with an electrically controlled pump unit.

In FIG. 3 and FIG. 4 two further variants of the above-described damper unit 10 with one pump unit are shown. According to the example in FIG. 3, a pump unit with a pump 23 is generally used, which is installed in a tube branch 231 connecting the upper container space 21 with the lower container space 22. By actuating the pump 23, the depth level/height level can be adjusted even without vibration excitation, for example while being stationary. In FIG.

4 the damper unit 10 comprises a pneumatic (or hydraulic) pump 24 with an (electronic) control unit 241.

Figure 5:
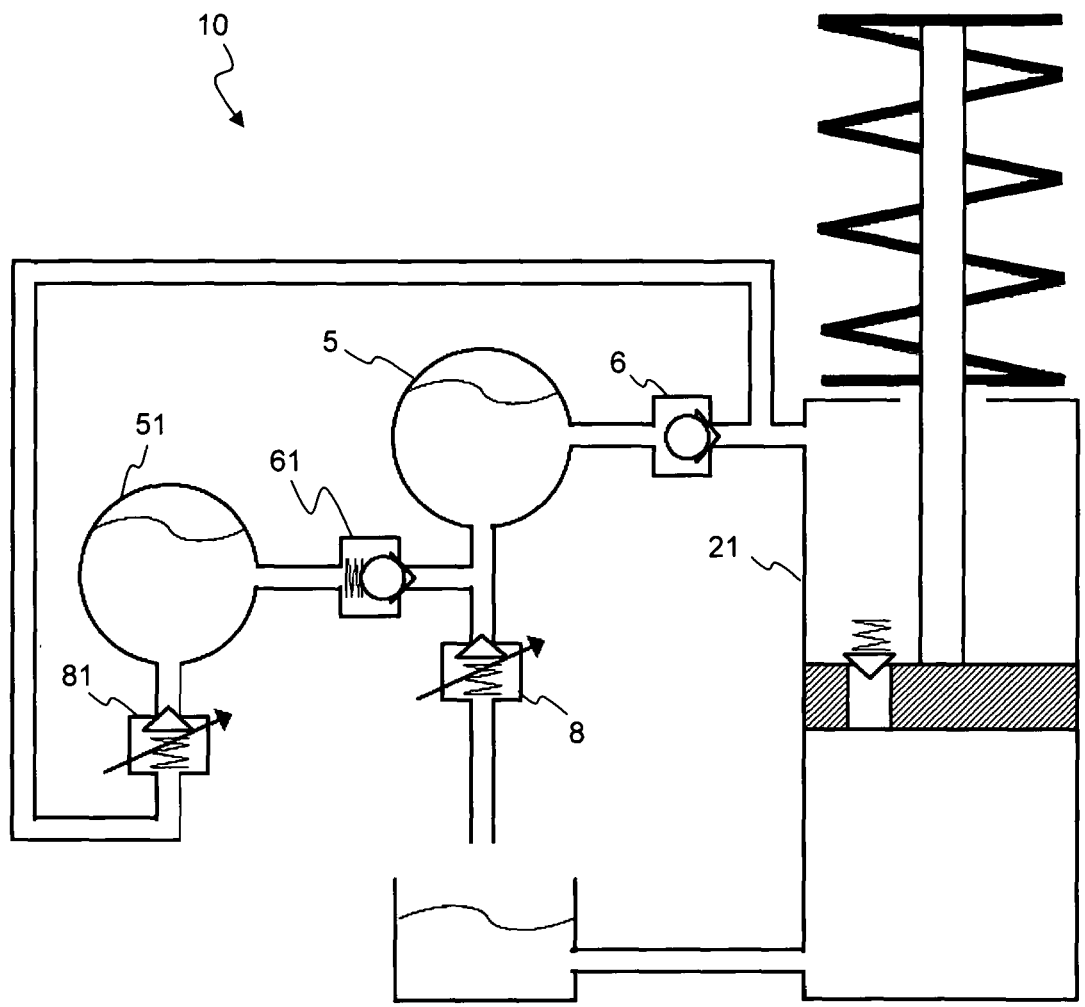
FIG. 5 shows an additional variant of the damper unit from FIG. 1 with two pressure accumulators.

Another variant is shown in FIG. 5, where the damper unit 10 comprises a further (e.g. spring-loaded) check valve 61, a further pressure accumulator 51 and a further (e.g. switchable) pressure-limiting unit 81. The further check valve 61 is arranged between the pressure accumulator 5 and the pressure-limiting unit 8. The further check valve 61 opens at a lower pressure compared to the pressure-limiting unit 8. The further check valve 61 is adjoined by the further pressure accumulator 51, which in turn is connected to the further pressure-limiting unit 81. The further pressure-limiting unit 81 is connected to the upper container space 21. Due to the further pressure accumulator 51, the possibility of storing energy can be increased.

Figure 6:
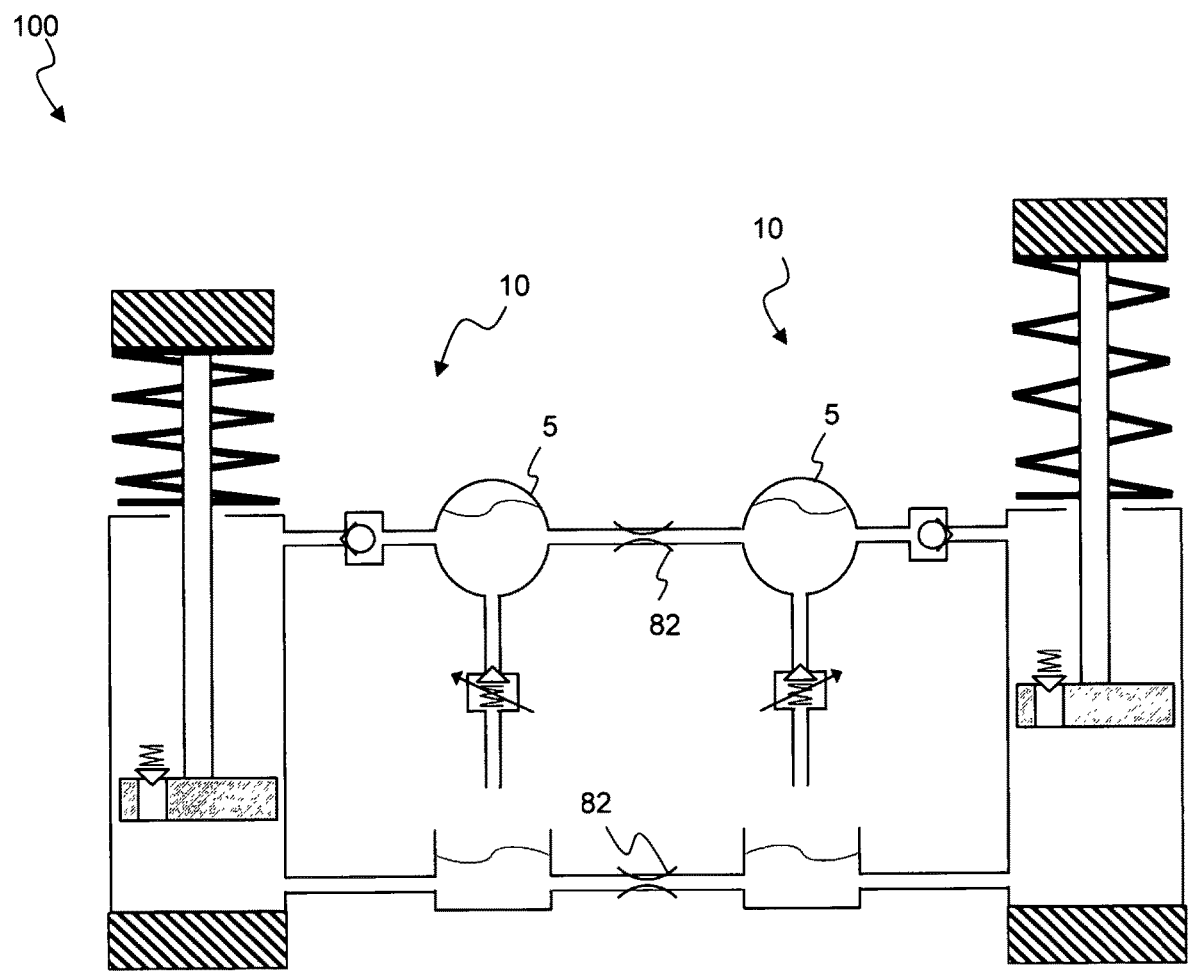
FIG. 6 shows a chassis with two damper units.

The aspect of the invention concerning the chassis 100 is shown in FIG. 6, whereby two damper units 10 are shown. Hence, for example, the axle (front axle or rear axle) of a vehicle (not shown) can be realized. The two pressure accumulators 5 are fluidically coupled with each other via a throttle unit 82 (additive or alternative orifice unit). This ensures a uniform pressure, which allows even level adjustment in all damper units. The respective reservoirs 9 are also fluidically coupled with each other, so that the damper fluid can be exchanged. In the representation shown, the reservoirs 9 are coupled with each other via a throttle unit 82.

The invention claimed is:

1. Damper unit for a chassis of a vehicle with leveling system, comprising a hydraulic cylinder having a container tube which is filled with damper fluid and in which a piston is movably mounted and separates an upper container space from a lower container space, and wherein the piston comprises a first valve through which the damper fluid flows when the piston moves in a first direction, which damper unit further comprises a pressure accumulator and a check valve, wherein the pressure accumulator is connected to the container tube via the check valve in such a manner that, when the piston moves in at least one direction, damper fluid is pumped through the check valve into the pressure accumulator and wherein the pressure accumulator is connected to a pressure-limiting unit.

2. Damper unit according to claim 1, further comprising a reservoir, wherein the pressure-limiting unit is arranged between the pressure accumulator and the reservoir, and wherein the damper unit comprises an additional switching valve between the reservoir and the container tube.

3. Damper unit according to claim 2, wherein the reservoir is a pressureless reservoir.

4. Damper unit according to claim 1, further comprising a pump unit, wherein the pump unit comprises a hydraulic pump or a pneumatic pump.

5. Chassis according to claim 4, wherein the pressure accumulators and the pressureless reservoirs are each hydraulically connected via valves, throttles or orifices.

6. Damper unit according to claim 1, wherein the pressure accumulator is connected to the container tube at the upper container space via the check valve in such a manner that, when the piston moves in the direction of the piston rod, damper fluid is pumped through the check valve into the pressure accumulator.

7. Damper unit according to claim 1, wherein the piston rod is directly or indirectly tensioned against the container tube by means of a spring.

8. Damper unit according to claim 1, wherein the pressure accumulator is a pneumatic pressure accumulator.

9. Damper unit according to claim 1, wherein the pressure accumulator is a mechanical pressure accumulator.

10. Damper unit according to claim 1, wherein the pressure-limiting unit is designed in such a way that it has a predetermined opening pressure.

11. Damper unit according to claim 1, wherein the pressure-limiting unit is designed in such a way that it has an adjustable opening pressure.

12. Damper unit according to claim 1, wherein the pressure-limiting unit comprises a throttle unit and/or an orifice unit.

13. Damper unit according to claim 1, further comprising a further check valve, a further pressure accumulator and a further pressure-limiting unit.

14. Chassis with several damper units according to claim 1, wherein each damper unit comprises a pressure accumulator or wherein at least two damper units comprise a single pressure accumulator.

\* \* \* \* \*